April 19, 1960     F. C. HALLDEN     2,933,253

BINARY ADDING CIRCUIT

Filed Aug. 22, 1957     2 Sheets-Sheet 1

April 19, 1960   F. C. HALLDEN   2,933,253
BINARY ADDING CIRCUIT
Filed Aug. 22, 1957   2 Sheets-Sheet 2

United States Patent Office

2,933,253
Patented Apr. 19, 1960

2,933,253

BINARY ADDING CIRCUIT

Frederick C. Hallden, Floral Park, N.Y., assignor to Hazeltine Research, Inc., Chicago, Ill., a corporation of Illinois Application August 22, 1957, Serial No. 679,730

10 Claims. (Cl. 235—176)

General

This invention relates to a binary adding circuit for use in digital systems employing the conventional binary arithmetical system. For such use, the invention is a highly versatile basic computer building block.

Binary addition represents in most computers, today, a fundamental arithmetical operation. In practice, computers employ adding circuits to perform the arithmetical operations of addition, subtraction, multiplication, and division. This invention is a serial adder. In a serial or sequential adder, the binary digits of each of the two numbers to be added together are applied serially in time to two input circuits of the adding unit. Binary digits of the same order in each number are applied simultaneously. The sum is obtained also serially in time from an output circuit. It is usually necessary to add two binary digits of the same order appearing simultaneously at the input circuits of the adder. Heretofore, in serial adders a plurality of synchronizing signals, in addition to the clock or basic synchronizing signal, were required to make the adding circuit function. Conventionally, at the conclusion of each particular binary digit order, elements of the adding circuit must be reset prior to the next additive operation. The resetting process often requires a plurality of synchronizing signals in addition to the clock signal. Also, in a serial adder the requirement of a carry signal for the next addition is determined in a current addition. A carry signal must be stored for future use on the next addition at the same time the mechanism developing the carry signal is reset. This requirement has complicated an otherwise simple adding mechanism. Often an auxiliary signal-supply means is required for generating the answer signal.

The present invention is an improved binary adding circuit in which the clock or basic synchronizing signal is used in place of much of the foregoing. The clock signal acts as a synchronizing medium and is further used to generate the answer signal. The carry mechanism in the present invention forms an integral part of the adding circuit. Further simplification, in terms of reducing the number of components required to construct a binary adding circuit, is achieved by the use of a novel approach to the problem of addition. The performance of the invention is substantially equal to adders currently in use. Inherently, greater reliability is expected in view of the drastic reduction in elements required in constructing the improved adding circuit.

It is an object of the present invention, therefore, to provide a new and improved binary adding circuit which avoids the use of elaborate synchronizing means.

It is a further object of the invention to provide a new and improved binary adding circuit simplified in design and construction and capable of making computations involving addition at high speeds.

It is still a further object of the invention to provide a new and improved binary adding circuit inherently capable of high operational reliability.

In accordance with the invention, a binary adding circuit for adding two serial signals representative of binary numbers to produce a sum signal representative of the sum of the numbers comprises circuit means for supplying the serial signals and a source of periodic pulses synchronous with the period of the digit pulses in such serial signals. The binary adding circuit also includes a circuit responsive to the serial signals and the periodic pulses for the translation of selected ones of the periodic pulses to form the sum signal. The translation circuit includes means for developing first pulses indicative of the simultaneous presence of digit pulses in the serial signals and means for developing second pulses indicative of the simultaneous absence of digit pulses in the serial signals. The translation circuit further includes a bistable circuit responsive to the first pulses to switch to a carry status, if not already therein, and to the second pulses to switch to a no-carry status, if not already therein. A first translation control means actuated by the bistable circuit is also included in the translation circuit for causing said translation when the bistable circuit is in the no-carry status and preventing such translation when the bistable circuit is in the carry status unless such actuation is overridden. The translation circuit also includes a second translation control means responsive to the first pulses for overriding such actuation and causing such translation when the bistable circuit is in the carry status and responsive to the second pulses for overriding such actuation and preventing such translation when the bistable circuit is in the no-carrying status. Finally, the translation circuit includes third translation control means for overriding both the first and second control means and causing such translation in response to the switching of the bistable circuit from a carry to a no-carry status and preventing such translation in response to the switching of the bistable circuit from no-carry to carry status.

For a better understanding of the present invention, together with other and further objects thereof, reference is had to the following description taken in connection with the accompanying drawings, and its scope will be pointed out in the appended claims.

Referring to the drawings:

Fig. 2 represents a chart useful in explaining the operation of the representative embodiment of the invention.

Figure 1:
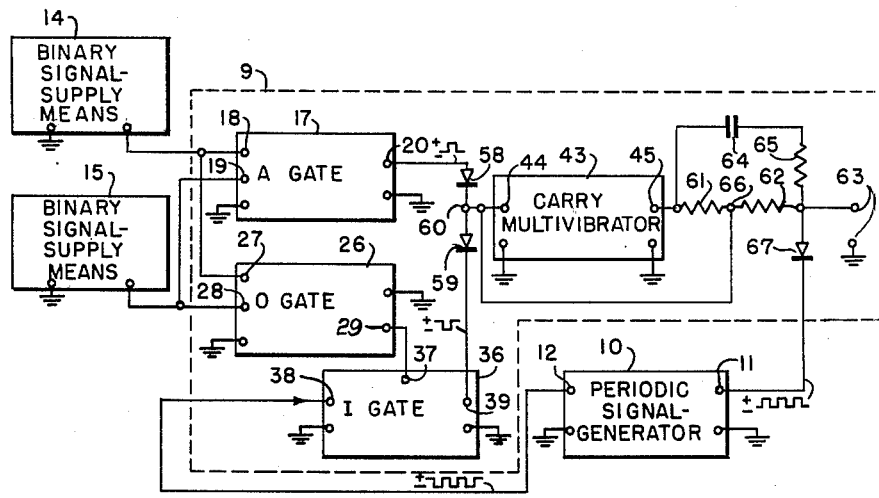
Fig. 1 is a block circuit diagram of a representative embodiment of a binary adding circuit embodying the invention in a particular form.

Description of Fig. 1 adding circuit

In Fig. 1 of the drawings, there is shown a diagram including a binary adding circuit 9 embodying an example of the invention, i.e., circuit 9 is a binary adding circuit for adding two serial signals representative of binary numbers to produce a sum signal representative of the sum of said numbers. Circuit 9 includes circuit means for supplying two such serial signals to be added, for example the connections to binary signal-supply means 14 and 15, each of which supplies conventional serial signals in the form of time-spaced digit pulses. Circuit 9 also includes a source of periodic pulses synchronous with the period of the digit pulses in such serial signals. For example, such source may be the indicated connections to the generator 10. The pulse repetition rate of generator 10 is equal to the repetition rate of the digit pulse positions of the serial signals from supply means 14 and 15. The pulses of both the signal-supply means 14 and 15 and the periodic signal generator 10 may be of uniform amplitude and width. However, as a practical matter, to improve the reliability of the adding circuit 9, the digit pulses from means 14 and 15 may be wider than those of generator 10 by an amount sufficient to allow for any relative phase deviation occurring between the pulses.

The circuit 9 also includes a translation circuit responsive to the serial signals and the periodic pulses for the translation of selected ones of the periodic pulses of generator 10 to form the said sum signal. Thus, the translation circuit includes means for developing first pulses indicative of the simultaneous presence of digit pulses in said serial signals, for example the conventional "and" gate (A gate) 17 having its inputs 18 and 19 connected to the means 14 and 15, respectively, and its output 20 connected to the anode of a diode 58. As will be understood, the A gate 17 produces an output pulse only when both serial signals from means 14 and 15 include a binary digit pulse at the same time; the A gate output may be a positive pulse as indicated. Further, the translation circuit includes means for developing second pulses indicative of the simultaneous absence of digit pulses in said serial signals which may comprise the conventional "or" gate (O gate) 26 and the conventional "inhibiting" gate (I gate) 36 with their connections to means 14 and 15, and to the generator 10, respectively. The I gate 36 may pass the indicated negative pulses from generator 10 from its input 38 to output 39 to the cathode of diode 59 when not inhibited from so doing by pulses from the output 29 of O gate 26 to the input 37 of I gate 36; it being understood that the O gate will produce such pulses whenever digit pulses are supplied to its inputs 27 or 28 by either of the means 14 and 15, i.e., the I gate will have an output only when there is a simultaneous absence of digit pulses from the means 14 and 15.

The translation circuit also includes a bistable circuit responsive to the first pulses to switch to a carry status if not already therein and to the second pulses to switch to a no-carry status if not already therein; for example, the carry multivibrator 43 having its input 44 connected to the anode of diode 59 and the cathode of diode 58 and having outputs as hereinafter indicated. Multivibrator 43 may be arranged so that its output terminal 45 is positive when in the no-carry position and negative when in the carry position for proper selection of pulses for translation as will appear presently; further it may be arranged so that the only effect on it of a pulse from I gate 36 is to switch it from carry to no-carry status and the only effect on it of a pulse from A gate 17 is to switch it from no-carry to carry status.

Also included in the translation circuit is a first translation control means actuated by the bistable circuit for causing translation of the selected pulses from generator 10 to the output terminal 63 when the bistable circuit including multivibrator 43 is in no-carry status and preventing such translation when the bistable circuit is in carry status unless such actuation is overridden by the means which will follow. This first translation control means may include the output 45 and the indicated connections to the anode of diode 67 and output 63. Thus, in the no-carry status when the terminal 45 is positive, pulses may be translated from generator 10 to output 63 but in the carry status when output terminal 45 is negative, no such translation may occur, except as follows.

The translation circuit also includes a second translation control means responsive to the first pulses for overriding the actuation by the first translation control means and causing such translation when said bistable circuit is in carry status and responsive to the second pulses for overriding such actuation and preventing such translation when said bistable circuit is in no-carry status. This means may comprise the connection indicated between the junction 60 between diodes 58 and 59 and the junction 66 between the resistors 61 and 62 as well as the resistors themselves. Thus, this means will permit positive pulses from A gate 17 through diode 58 to cause said selected translation of pulses from generator 10 through diode 67 to output 63 even though the output terminal 45 is negative when the multivibrator is in carry status; and will permit negative pulses from I gate 36 through diode 59 to prevent such translation even though the multivibrator 43 is in no-carry status with output terminal 45 positive.

The translation circuit further includes a third translation control means for overriding both the first and second control means and causing such translation responsive to the switching of said bistable circuit from carry to no-carry status and preventing such translation responsive to the switching of said bistable circuit from no-carry to carry status. For example, this means may include the connection from the terminal 45 through condenser 64 and resistor 65 to the terminal 63. With this third translation control means, the switching of multivibrator 43 from carry to no-carry status with the consequent change of potential of terminal 45 from negative to positive will cause translation of pulses from generator 10 through diode 67 to output 63; and the switching of the multivibrator 43 from no-carry to carry status with the consequent switch of the potential of output terminal 45 from positive to negative will prevent such translation.

*Operation of Fig. 1 embodiment*

From what has already been said, it will be apparent that the foregoing circuit necessarily operates to meet the requirements of the following chart which corresponds to the mathematical requirements of binary addition of binary serial signals. The chart indicates the effect of the three possible input pulse combinations (from means 14 and 15) on the multivibrator 43 and the output at terminal 63.

| Input | If Already In No-Carry Position | | If Already In Carry Position | |
|---|---|---|---|---|
| 0,0 | Remain No-Carry. | Output—0. | Switch To No-Carry. | Output—1. |
| 0,1 | Remain No-Carry. | Output—1. | Remain Carry. | Output—0. |
| 1,0 | Remain No-Carry. | Output—1. | Remain Carry. | Output—0. |
| 1,1 | Switch To Carry. | Output—0. | Remain Carry. | Output—1. |

The left-hand column indicates the three possible combinations of digit information from the means 14 and 15 at the time when the binary information for any particular order should be present. Thus, at that time, digit pulses may be simultaneously absent from the outputs of means 14 and 15 (0, 0), a digit pulse may be present in one of the outputs but not the other (0, 1 or 1, 0), or digit pulses may be simultaneously present in both outputs (1, 1). As the second and third columns indicate, if the multivibrator 43 is in no-carry position and digit pulses are simultaneously absent, the multi-vibrator remains in the no-carry position and there is no output at terminal 63 since the negative pulse from I gate 36 through diode 59, junctions 60 and 66, and resistor 61 overrides the positive potential of terminal 45 to prevent translation of a pulse from generator 10 through diode 67; and, if the multivibrator is already in carry position, the negative pulse from I gate 36 through diode 59 is effective to switch the multivibrator 43 to no-carry position as a consequence of which a positive pulse through condenser 64 and resistor 65 overrides the negative pulse through junctions 60 and 66 and energizes diode 67 to permit translation of a pulse from generator 10. As the second and third columns indicate, if the multivibrator 43 is in no-carry position and a digit pulse is supplied by either means 14 or 15 alone, the multivibrator remains in no-carry position because there is no output from either A gate 17 or I gate 36 to switch it and the positive potential at terminal 45 of the multivibrator permits energization of the diode 67 and consequent passage of a pulse from generator 10 to terminal 63; whereas, if in the same situation the multi-vibrator is already in carry position, it remains in carry position for the same reason but this time there is no output at terminal 63 because the terminal 45 is negative. As the second and third columns indicate, if the multivibrator 43 is in no-carry position and digit pulses are simultaneously present, the multivibrator is switched to the carry position by the consequent positive pulse from the A gate through diode 58 and this switch with consequent reversal of polarity at terminal 45 from positive to negative will cause the imposition of a negative potential on diode 67 through condenser 64 and resistor 65 so that there is no output pulse at terminal 63 from generator 10 (the positive pulse coming from the A gate through junctions 60 and 66 being overridden by the negative potential); while, if in this situation the multivibrator is already in carry position, it remains carry and, because of the positive pulse from A gate through junctions 60 and 66, a positive pulse is permitted to be translated from generator 10 through diode 67 to terminal 63.

The manner of proportioning the various voltages and resistors to get the foregoing effects will be apparent to those skilled in the art after having read the foregoing. Resistors 61 and 62 will be large in comparison to the resistance of diode 67. The voltages of the pulses from the A and I gates will be of sufficient value to override the potential of terminal 45 when required and the resistors 62 and 65 will be of sufficient value to permit the voltage pulses through condenser 64 and resistor 65 to override the voltages at junction 66 when required.

It can be said that the three control points controlling the translation of the clock pulses from generator 10, terminal 45, junction 66, and terminal 63 are in series. The control potential from terminal 45 must pass through the control points at junction 66 and terminal 63. Similarly, the control potential developed at junction 66 passes through the control point at terminal 63.

The operation of the Fig. 1 embodiment may be understood better by performing a simple addition. For that purpose reference is made to Fig. 2 which is a chart outlining a step-by-step analysis of the operation of the Fig. 1 embodiment. For illustrative purposes, the binary number 28 will be added to binary number 58 and the sum binary number 86 will be derived. The addition process is represented in A of Fig. 2. In B of Fig. 2 is the step-by-step chart outlining the operation of the illustrative addition. The headings to the chart are self-explanatory and require no further explanation. Prior to the start of the calculation, it is assumed that the carry multivibrator 43 is in a no-carry position, i.e., the adder is empty of any numerical information. In the illustration, time $t_1$ is the start of the calculation period. In accordance with our example, at time designated $t_1$ a "0" digit pulse is obtained from both binary signal-supply means 14 and 15. The simultaneous absence of pulses at the input of O gate 26 does not develop an inhibiting pulse at the output terminal 29 of O gate 26. Consequently, a negative clock pulse coupled from periodic signal generator 10 to terminal 38 of I gate 36 is permitted to pass through I gate 36 to output terminal 39. In Fig. 2 under the heading "Terminal 39," a negative pulse is represented. The negative pulse is coupled through diode 59 to carry multivibrator 43. A change of stability in carry multivibrator 43 does not occur at this time since the carry multivibrator is already in a no-carry position. In the no-carry condition of stability a positive potential is present at output terminal 45. This positive potential is coupled through resistor 61 and resistor 62 to output terminal 63. In the absence of all other control means, a positive potential at terminal 63 will allow a positive clock pulse to be translated through diode 67 to develop a "1" signal at terminal 63. However, the negative pulse generated by the simultaneous absence of input digit pulses is coupled from the anode of diode 59 to junction 66. At this time, the negative pulse overrides the potential at junction 66 for the duration of the negative pulse. In Chart B of Fig. 2 this condition is symbolically represneted by a positive potential within a negative pulse. The overriding negative pulse is coupled through resistor 62 to output terminal 63. Consequently, for the duration of this negative pulse, the anode of diode 67 is driven negative thereby preventing the passage of a clock pulse to terminal 63. In the absence of this clock pulse, a "0" signal is thereby developed at output terminal 63. At time $t_2$, in our illustrative problem, a "0" input digit pulse is obtained from binary signal-supply means 14 and a "1" digit pulse is derived from binary signal-supply means 15. The absence of simultaneous input digit pulses does not activate A gate 17 and, consequently, no output pulse is present at terminal 20. The existence of a binary digit input pulse from binary signal-supply means 15 activates O gate 26 causing an output pulse to be generated at terminal 20 of O gate 26. The output pulse is coupled to terminal 37 of I gate 36 thereby inhibiting the translation of the negative clock pulse occurring at terminal 38 simultaneously with the appearance of the inhibiting pulse at terminal 37. It has just been seen that the presence of only one binary digit pulse in the outputs of binary signal-supply means 14 and 15 fails to generate a pulse from either A gate 17 or I gate 36. Consequently, no pulses are applied to diodes 58 and 59. The carry multivibrator 43, therefore, remains in the no-carry position and terminal 45 remains positive. Junction 66 in the absence of an overriding pulse also remains positive. The resistor-condenser network 64, 65, as previously described, is inactive since there has not been a change in stability and, consequently, output terminal 63 is also positive. The positive potential at output terminal 63 permits the positive clock pulses from periodic signal generator 10 to be translated through diode 67 to develop a "1" output pulse at terminal 63. At time $t_3$, a "1" binary digit pulse is derived from binary signal-supply means 14 and a "0" binary digit derived from binary signal-supply means 15. The course of events just described for the "0, 1" condition will be repeated for the "1, 0" position and a second "1" pulse developed at output terminal 63. At time $t_4$, binary digit pulses are simultaneously present (1, 1). Accordingly, a positive pulse is developed at the output terminal 20 of A gate 17. This positive pulse is coupled through diode 58 to input terminal 44 of carry multivibrator 43. The positive pulse at the input of carry multivibrator 43 causes carry multivibrator 43 to change its condition of stability. At this time, the condition of stability changes from a no-carry status to a carry status. Accordingly, the potential at terminal 45 becomes negative. In Fig. 2 under column heading "Terminal 45" a negative value is reprsented for clarity. The "1, 1" signal is also coupled from the cathode of diode 58 to junction 66 momentarily maintaining the positive potential at junction 66 for the duration of the pulse signal. However, the change of voltage at terminal 45 is coupled through condenser 64 and resistor 65 to output terminal 63. As heretofore described, a signal coupled through the resistor-condenser network is the dominant controlling factor. Accordingly, the negative pulse derived from the resistor-condenser network prevents the passage of the positive clock pulse through diode 67 and a "0" pulse is developed at output terminal 63 at this time. A subsequent "1, 1" pulse at time $t_5$ causes junction 66 to override the negative bias established by the carry multivibrator 43 at terminal 45 thereby resulting in a "1" pulse developed at terminal 63 at time $t_5$. The "0, 1" signals present at time $t_6$, in a manner heretofore described, do not override the control established by carry multivibrator 43 and a "0" signal is developed by the negative bias due to the carry state of carry multivibrator 43 at time $t_6$. At time $t_7$, "0, 0" input signals are applied and a negative signal is developed at terminal 39 of I gate 36. This negative signal when applied through diode 59 to the carry multivibrator 43 causes a change of stability from carry to no-carry status. Accordingly, the potential at terminal 45 becomes positive. The change of potential at terminal 45 is coupled through the resistor-condenser network, condenser 64 and resistor 65, to terminal 63. The positive pulse at terminal 63 permits a positive clock pulse to be translated through diode 67 and develop a "1" pulse at output 63.

The pulses generated at output terminal 63 serially in time are identical with the signals representing the binary number 86 or the answer to the illustrative addition problem.

Figure 3:
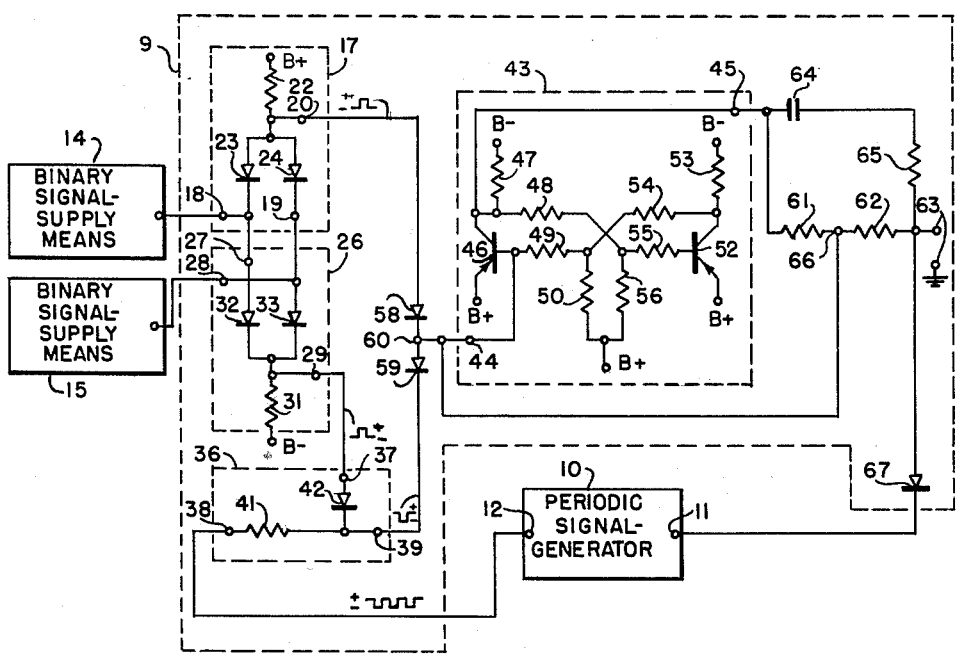
Fig. 3 is a circuit diagram of a representative embodiment of the invention in a particular form.

*Description and operation of Fig. 3 circuit diagram*

Referring to Fig. 3 of the drawings, there is represented a circuit diagram embodying the principles of the invention and, more patricularly, suggested circuits for the blocks in Fig. 1. In Fig. 3, binary adding circuit 9 is shown in dotted outline. Resistor 22 is connected to a positive B+ potential and to the series parallel combination of diodes 23, 24, 32, and 33. Also in series with the resistor 22 and the diodes is resistor 31. The combination of resistors 22 and 31 and diodes 23, 24, 32, and 33 constitutes a voltage-divider network between the positive B+ potential and a negative B— potential. The resistance of resistors 22 and 31 is considerably higher than the series impedance of the diodes. A segment of the voltage-divider network comprising resistor 22 and diodes 23 and 24 comprises A gate 17. Upon the application of simultaneous positive pulses from binary signal-supply means 14 and 15 to the cathodes of diodes 23 and 24, respectively, the cathodes of diodes 23 and 24 are raised in a positive direction until conduction through these diodes terminates. The increase in potential at the cathodes of the diodes 23 and 24 is reflected through the diodes 23 and 24 to output terminal 20 of A gate 17. Output terminal 20 is, therefore, raised in potential in a positive direction for the duration of the binary pulses applied to A gate 17. In this manner, a positive signal is developed at output terminal 20 of A gate 17. The positive pulse is coupled through diode 58 to junction 60 and input terminal 44 of carry multivibrator 43.

The lower section of the voltage-divider network comprises an O gate 26. A positive pulse from either or both binary signal-supply means 14 or 15 raises the potential of the anodes of diodes 32 and 33, respectively. This increase in potential is translated through diodes 32 and 33 to output terminal 29 of O gate 26 thereby developing a positive pulse output. The output pulse from O gate 26 is coupled through terminal 37 of I gate 36 to the anode of diode 42. At input terminal 38 of I gate 36 negative clock pulses are applied from periodic signal generator 10. In the absence of an inhibiting pulse at terminal 37 of I gate 36, the negative clock pulse is translated through terminal 39 of I gate 36 to the cathode of diode 59. A negative potential at the cathode of diode 42 permits the translation of the negative clock pulse through diode 59 to junction 60 and terminal 44. A positive pulse applied to diode 42 from O gate 26 is translated through diode 42 and coupled through terminal 39 to the cathode of diode 59. This positive pulse is of sufficient amplitude to cut off diode 59. The positive pulse derived from O gate 26 overrides the negative clock pulse derived from the periodic signal generator 10 because resistor 41 tends to isolate diode 59 from the effects of the negative clock pulses. This isolation is achieved by a marked difference in impedances in the inhibiting pulse circuit and the negative clock pulse circuit. The impedance of the inhibiting pulse circuit through diode 42 is much less than the magnitude of resistor 41 and is thereby able to control the potential at the cathode of diode 59. Carry multivibrator 43 is substantially conventional in construction and operation. Carry multivibrator 43 is a bistable circuit means having two conditions of stability. The control over stability is determined by the nature of pulses applied at input terminal 44. In the simultaneous presence of binary input pulses, a positive pulse is developed by A gate 17 and coupled through diode 58 to input terminal 44. A positive pulse when applied to the base of transistor 46 cuts off transistor 46 causing its collector to go negative towards a B— potential. The absence of simultaneous input pulses to O gate 26 will cause, in a manner heretofore described, the development of a negative pulse at output terminal 39 of I gate 36. This negative pulse is coupled through diode 59 to terminal 44. A negative pulse applied to the base of transistor 46 will cause transistor 46 to conduct thereby increasing the potential of its collector to a positive potential. The negative and positive pulses applied to input terminal 44 of carry multivibrator 43 cannot occur simultaneously. Consequently, the condition of stability of carry multivibrator 43 may alternate between both conditions of stability depending on the nature of the input pulse. Output terminal 45 is directly coupled to the collector of transistor 46. It was previously shown that the potential at the collector of transistor 46 will vary with the condition of stability. Accordingly, the potential of output terminal 45 is also determined by the condition of stability of carry multivibrator 43. The direct coupling of terminal 45 through resistors 61 and 62 to output terminal 63 couples the potentials existing at the collector of transistor 46 and the output terminal 45 to output terminal 63. As previously described, this potential initially controls the type of pulse to be developed at output terminal 63. The operation of the binary adding circuit 9 in Fig. 3 is identical to that described for the Fig. 1 embodiment and need not be discussed in further detail.

The Fig. 3 circuit diagram illustrates that the present invention may be constructed with the use of two transistors and eight semiconductor diodes. From a standpoint of quantity, these ten elements are substantially less than the number of transistors and diodes conventionally used in adding circuits. Cooperating resistive and capacitive elements are correspondingly reduced to a relatively small quantity. The stability and reliability accompanying the simplicity are believed to be considerable. While the discussion has been limited to semiconductor devices, it is understood that vacuum tubes may be substituted if desired.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A binary adding circuit for adding two serial signals representative of binary members to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means for developing first pulses indicative of the simultaneous presence of digit pulses in said serial signals; means for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by the bistable circuit for causing said translation when the bistable circuit is in no-carry status and preventing such translation when the bistable circuit is in carry status unless such actuation is overridden as follows: second translation control means responsive to the first pulses for overriding such actuation and causing such translation when said bistable circuit is in carry status and responsive to the second pulses for overriding such actuation and preventing such translation when said bistable circuit is in no-carry status; and third translation control means for overriding both the first and second control means and causing such translation responsive to the switching of said bistable circuit from carry to no-carry status and preventing such translation responsive to the switching of said bistable circuit from no-carry to carry status.

2. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means, including an "and" gate, for developing first pulses indicative of the simultaneous presence of digit pulses in said serial signals; means, including an "or" gate in combination with an "inhibiting" gate, for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by the bistable circuit for causing said translation when the bistable circuit is in no-carry status and preventing such translation when the bistable circuit is in carry status unless such actuation is overridden as follows: second translation control means responsive to the first pulses for overriding such actuation and causing such translation when said bistable circuit is in carry status and responsive to the second pulses for overriding such actuation and preventing such translation when said bistable circuit is in no-carry status; and third translation control means for overriding both the first and second control means and causing such translation responsive to the switching of said bistable circuit from carry to no-carry status and preventing such translation responsive to the switching of said bistable circuit from no-carry to carry status.

3. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means for developing first pulses indicative of the simultaneous presence of digit pulses in said serial signals; means for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by the bistable circuit for causing said translation when the bistable circuit is in no-carry status and preventing such translation when the bistable circuit is in carry status unless such actuation is overridden as follows: second translation control means in series relationship with the first control means and responsive to the first pulses for overriding such actuation and causing such translation when said bistable circuit is in carry status and responsive to the second pulses for overriding such actuation and preventing such translation when said bistable circuit is in no-carry status; and third translation control means in series relationship with the first and second control means for overriding both the first and second control means and causing such translation responsive to the switching of said bistable circuit from carry to no-carry status and preventing such translation responsive to the switching of said bistable circuit from no-carry to carry status.

4. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means for developing first pulses indicative of the simultaneous presence of digit pulses in said serial signals; means for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by the bistable circuit for causing said translation when the bistable circuit is in no-carry status and preventing such translation when the bistable circuit is in carry status unless such actuation is overridden as follows: second translation control means in series relationship with the first control means and responsive to the first pulses for overriding such actuation and causing such translation when said bistable circuit is in carry status and responsive to the second pulses for overriding such actuation and preventing such translation when said bistable circuit is in no-carry status; and third translation control means, including a capacitive coupling network to the bistable circuit, and in a series relationship with the first and second control means for overriding both the first and second control means and causing such translation responsive to the switching of said bistable circuit from carry to no-carry status and preventing such translation responsive to the switching of said bistable circuit from no-carry to carry status.

5. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising means for developing first pulses indicative of the simultaneous presence of digit pulses in said serial signals; means for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by the bistable circuit for causing said translation when the bistable circuit is in no-carry status and preventing such translation when the bistable circuit is in carry status unless such actuation is overridden as follows; second translation control means in series relationship with the first control means and isolated therefrom by a series impedance and responsive to the first pulses for overriding such actuation and causing such translation when said bistable circuit is in carry status and responsive to the second pulses for overriding such actuation and preventing such translation when said bistable circuit is in no-carry status; and third translation control means in series relationship with the first and second control means and isolated therefrom by series impedances for overriding both the first and second control means and causing such translation responsive to the switching of said bistable circuit from carry to no-carry status and preventing such translation responsive to the switching of said bistable circuit from no-carry to carry status.

6. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signals comprising: means for developing first pulses indicative of the simultaneous presence of digit pulses in said serial signals; means for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by a unidirectional potential from the bistable circuit for causing said translation when the bistable circuit is in no-carry status and preventing such translation when the bistable circuit is in carry status unless such actuation is overridden as follows: second translation control means responsive to the first pulses for overriding the unidirectional potential actuation and causing such translation for the duration of the first pulses when said bistable circuit is in carry status and responsive to the second pulses for overriding the unidirectional potential actuation and preventing such translation for the duration of the second pulses when said bistable circuit is in no-carry status; and third translation control means for overriding both the first and second control means and causing such translation responsive to the switching of said bistable circuit from carry to no-carry status and preventing such translation responsive to the switching of said bistable circuit from no-carry to carry status.

7. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means, including an "and" gate, for developing first pulses indicative of the simultaneous presence of digit pulses in said serial signals; means, including an "or" gate in combination with an "inhibiting" gate, for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by a unidirectional potential from the bistable circuit for causing said translation when the bistable circuit is in no-carry status and preventing such translation when the bistable circuit is in carry status unless such actuation is overridden as follows: second translation control means responsive to the first pulses for overriding the unidirectional potential actuation and causing such translation for the duration of the first pulses when said bistable circuit is in carry status and responsive to the second pulses for overriding the unidirectional potential actuation and preventing such translation for the duration of the second pulses when said bistable circuit is in no-carry status; and third translation control means including a capacitive coupling network to the bistable circuit for overriding both the first and second control means and causing such translation responsive to the switching of said bistable circuit from carry to no-carry status and preventing such translation responsive to the switching of said bistable circuit from no-carry to carry status.

8. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means for developing first pulses indicative of the simultaneous presence of digit pulses in said serial signals; means for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by the bistable circuit for causing said translation when the bistable circuit is in no-carry status and preventing such translation when the bistable circuit is in carry status unless such actuation is overridden as follows: second translation control means responsive to the first pulses at an impedance level less than the bistable circuit actuation for overriding such actuation and causing such translation when said bistable circuit is in carry status and responsive to the second pulses for overriding such actuation and preventing such translation when said bistable circuit is in no-carry status; and third translation control means at a still lower impedance level for overriding both the first and second control means and causing such translation responsive to the switching of said bistable circuit from carry to no-carry status and preventing such translation responsive to the switching of said bistable circuit from no-carry to carry status.

9. A binary adding circuit for adding two serial signals representative of binary numbers to produce a sum signal representative of the sum of said numbers comprising: circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means, including an "and" gate, for developing first pulses indicative of the simultaneous presence of digit pulses in said serial signals; means, including an "or" gate in combination with an "inhibiting" gate, for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by the bistable circuit for causing said translation when the bistable circuit is in no-carry status and preventing such translation when the bistable circuit is in carry status unless such actuation is overridden as follows: second translation control means in series relationship with the first control means and responsive to the first pulses for overriding such actuation and causing such translation when said bistable circuit is in carry status and responsive to the second pulses for overriding such actuation and preventing such translation when said bistable circuit is no-carry status; and third translation control means, including a capacitive coupling network to the bistable circuit, and in a series relationship with the first and second control means for overriding both the first and second control means and causing such translation responsive to the switching of said bistable circuit from carry to no-carry status and preventing such translation responsive to the switching of said bistable circuit from no-carry to carry status.

10. A binary adding circuit for adding two serial signals representative of binary numbers to produce a sum signal representative of the sum of said numbers comprising: a circuit means for supplying said serial signals; a source of periodic pulses synchronous with the period of digit pulses in such serial signals; a circuit responsive to said serial signals and said periodic pulses for the translation of selected ones of said periodic pulses to form said sum signal comprising: means for developing first pulses indicative of the simultaneous presence of digit pulses in said serial signals; means for developing second pulses indicative of the simultaneous absence of digit pulses in said serial signals; a bistable circuit responsive to the first pulses to switch to a carry status if not already therein and to the second pulses to switch to a no-carry status if not already therein; first translation control means actuated by a unidirectional potential from the bistable circuit for causing said translation when the bistable circuit is in no-carry status and preventing such translation when the bistable circuit is in carry status unless such actuation is overridden as follows: second translation control means responsive to the first pulses at an impedance level less than the bistable circuit actuation for overriding the unidirectional potential actuation and causing such translation for the duration of the first pulses when said bistable circuit is in carry status and responsive to the second pulses for overriding the unidirectional potential actuation and preventing such translation for the duration of the second pulses when said bistable circuit is in no-carry status; and third translation control means at a still lower impedance level for overriding both the first and second control means and causing such translation responsive to the switching of said bistable circuit from carry to no-carry status and preventing such translation responsive to the switching of said bistable circuit from no-carry to carry status.

References Cited in the file of this patent
UNITED STATES PATENTS

| | | |
|---|---|---|
| 2,643,820 | Williams et al. | June 30, 1953 |
| 2,758,787 | Felker | Aug. 14, 1956 |
| 2,803,401 | Nelson | Aug. 20, 1957 |
| 2,808,202 | Hahn | Oct. 1, 1957 |

FOREIGN PATENTS

| | | |
|---|---|---|
| 706,457 | Great Britain | Mar. 31, 1954 |

OTHER REFERENCES

Washburn: An Application of Boolean Algebra to the Design of Electronic Switching Circuits, Communications and Electronics, pages 380 to 388, September 1953.

Richards: Arithmetic Operations in Digital Computers, D. Van Nostrand Co., Inc., New York (1955), page 132.